United States Patent [19]

Robinson et al.

[11] Patent Number: 5,263,839
[45] Date of Patent: Nov. 23, 1993

[54] APPARATUS FOR SENSING THE TEMPERATURE OF A THERMOPLASTIC SHEET IN A DIFFERENTIAL PRESSURE FORMING MACHINE

[75] Inventors: David J. Robinson, Midland; Samuel D. Ferguson, Gladwin, both of Mich.

[73] Assignee: Trafalgar House Inc., South Attleboro, Mass.

[21] Appl. No.: 788,160

[22] Filed: Nov. 5, 1991

[51] Int. Cl.$^5$ ............................................. B29C 51/46
[52] U.S. Cl. ........................... 425/143; 264/40.6; 374/121; 374/132; 425/387.1
[58] Field of Search ........... 264/40.6; 425/143, 144, 425/383, 387.1, 388; 374/121, 126, 132, 135; 359/367, 503

[56] References Cited

U.S. PATENT DOCUMENTS

| Re. 27,137 | 6/1971 | Brown et al. | 425/149 |
|---|---|---|---|
| 2,288,143 | 6/1942 | Sheppard | 359/503 |
| 3,865,912 | 2/1975 | Rosenkranz et al. | 264/40.6 |
| 3,940,221 | 2/1976 | Nissel | 425/141 |
| 4,164,869 | 8/1979 | Benzinger | 374/121 |
| 4,355,907 | 10/1982 | Orths et al. | 374/26 |
| 4,444,516 | 4/1984 | Dostoomian et al. | 374/131 |
| 4,516,864 | 5/1985 | Kim et al. | 374/130 |
| 4,737,038 | 4/1988 | Dostoomian | 374/139 |
| 4,749,856 | 6/1988 | Walker et al. | 250/227 |
| 4,871,493 | 10/1989 | Goto | 264/40.6 |
| 4,933,126 | 6/1990 | Shuman | 264/40.6 |
| 4,993,419 | 2/1991 | Pompei et al. | 128/664 |

FOREIGN PATENT DOCUMENTS 5260671  5/1971  Japan ............................. 374/126

*Primary Examiner*—Scott Bushey
*Attorney, Agent, or Firm*—Burnett W. Norton

[57] ABSTRACT

Apparatus the temperature of a thermoplastic sheet including a hollow wave guide having a bend therein, for receiving and transmitting infrared energy emitted by the sheet between a sheet heater at a sheet forming station and differential pressure forming apparatus at a forming station. One end of the hollow channel is mounted adjacent the sheet. At the opposite end of the hollow channel, a plurality of infrared energy sensors is mounted for sensing the infrared energy. Infrared sensors include mechanism for converting the infrared energy to electrical energy to operate a control system which controls the level of electrical power to the heater and thus controls the temperature of the sheet.

11 Claims, 2 Drawing Sheets

APPARATUS FOR SENSING THE TEMPERATURE OF A THERMOPLASTIC SHEET IN A DIFFERENTIAL PRESSURE FORMING MACHINE

BACKGROUND OF THE INVENTION

1. Field of the Invention

This invention relates to a differential pressure forming machine for forming an article in a sheet of thermoplastic material and more particularly to infrared energy sensing apparatus for sensing the temperature of the thermoplastic sheet between the sheet heating station and a differential pressure forming station.

2. Description of the Prior Art and Objects

Differential pressure forming machines have been provided heretofore for forming articles in a thermoplastic sheet of material. Such differential pressure machines are illustrated in U.S. Pat. No. Re. 27,137 granted to Gaylord W. Brown et al on Jun. 8, 1971.

The prior art differential pressure forming machines include a sheet heating oven through which a thermoplastic sheet is passed and heated before it is moved to a forming station. The ovens have included quartz or ceramic heaters having thermocouples in the heater elements which control the heater element temperature.

The sheet temperature is a critical, if not the most critical, variable among the various thermoforming variables, such as vacuum and air pressure, in the forming process. The prior art method of reading temperature of heaters with thermocouples, which were utilized to control the heater element, did not necessarily measure the sheet temperature. The sheet temperature may or may not follow or correlate to the temperature of the heating element depending on the various factors such as the quality and quantity of ambient air around the sheet.

Infrared sensors have been disposed between the heater and the forming station. Unfortunately, the placement of an infrared sensor at a location between the sheet heating oven and the differential pressure forming apparatus required substantial valuable space in the differential forming process. This construction has the disadvantage of providing a relatively large distance between the heating station and the forming station in which the sheet is allowed to cool. If a sheet cools too much between the heater and the former, scrap can result. By narrowing the gap between the heating station and the forming station by apparatus constructed according to the present invention, the scrap is reduced. Accordingly, it is an object of the present invention to provide a differential pressure forming machine having a new and novel sheet temperature sensing apparatus.

It is another object of the present invention to provide apparatus for sensing the temperature of a sheet which will decrease the scrap rate in a differential pressure forming machine.

A further object of the present invention is to provide apparatus for sensing the temperature of a thermoplastic sheet in a differential pressure forming machine including a hollow infrared energy wave guide which is disposed between the sheet heating oven and a differential pressure mold apparatus for guiding infrared energy to a remotely located infrared energy sensing apparatus.

Apparatus such as that disclosed in U.S. Pat. No. 4,933,126 granted to Jack N. Shuman on Jun. 12, 1990, includes an infrared thermometer mounted on a cylindrical sleeve or guide which extends centrally through a heating oven in the midst of the heating elements. The infrared thermometer will be affected by the heat emitted by the heating element as opposed to sensing only the infrared energy emitted by the heated sheet. Accordingly, it is another object of the present invention to provide an infrared energy sensing system which will be less affected by the heat emanating from the oven of a differential pressure forming machine.

A still further object of the present invention to provide apparatus for sensing the temperature of a thermoplastic sheet at a location between a sheet heating station and a differential pressure sheet forming station including remotely located infrared energy sensors and a wave guide for guiding the infrared energy emitted by the sheet to the infrared energy sensors.

Another object of the present invention is to provide apparatus for sensing the temperature of a thermoplastic sheet at a location between the sheet heating station and sheet forming station in a differential pressure forming machine including an infrared energy sensor located adjacent the sheet heating oven and a hollow wave guide tube having a 90° bend therein for receiving and transmitting the infrared energy emitted by the sheet at a location between the oven and the former in a 90° path to the infrared sensors.

Other objects and advantages of the present invention will become apparent to those of ordinary skill in the art as the description thereof proceeds.

SUMMARY OF THE INVENTION

Apparatus for sensing the temperature of a sheet of heated thermoplastic material in a differential pressure forming machine comprising: infrared energy sensing mechanism, and a hollow wave guide tube for guiding infrared energy emitted by the sheet to the infrared energy sensing mechanism including a first hollow tube section, disposed between a sheet heating oven and differential pressure forming apparatus, and a second transversely extending hollow tube section having one end coupled to the first hollow tube section and an open terminal end, and mechanism for mounting the infrared energy sensing mechanism at the terminal end of the second hollow tube section for sensing the infrared energy passing through said hollow wave guide.

DESCRIPTION OF THE DRAWINGS

The invention may be more readily understood by referring to the accompanying drawings, in which.

DESCRIPTION OF THE PREFERRED EMBODIMENT

Figure 1:
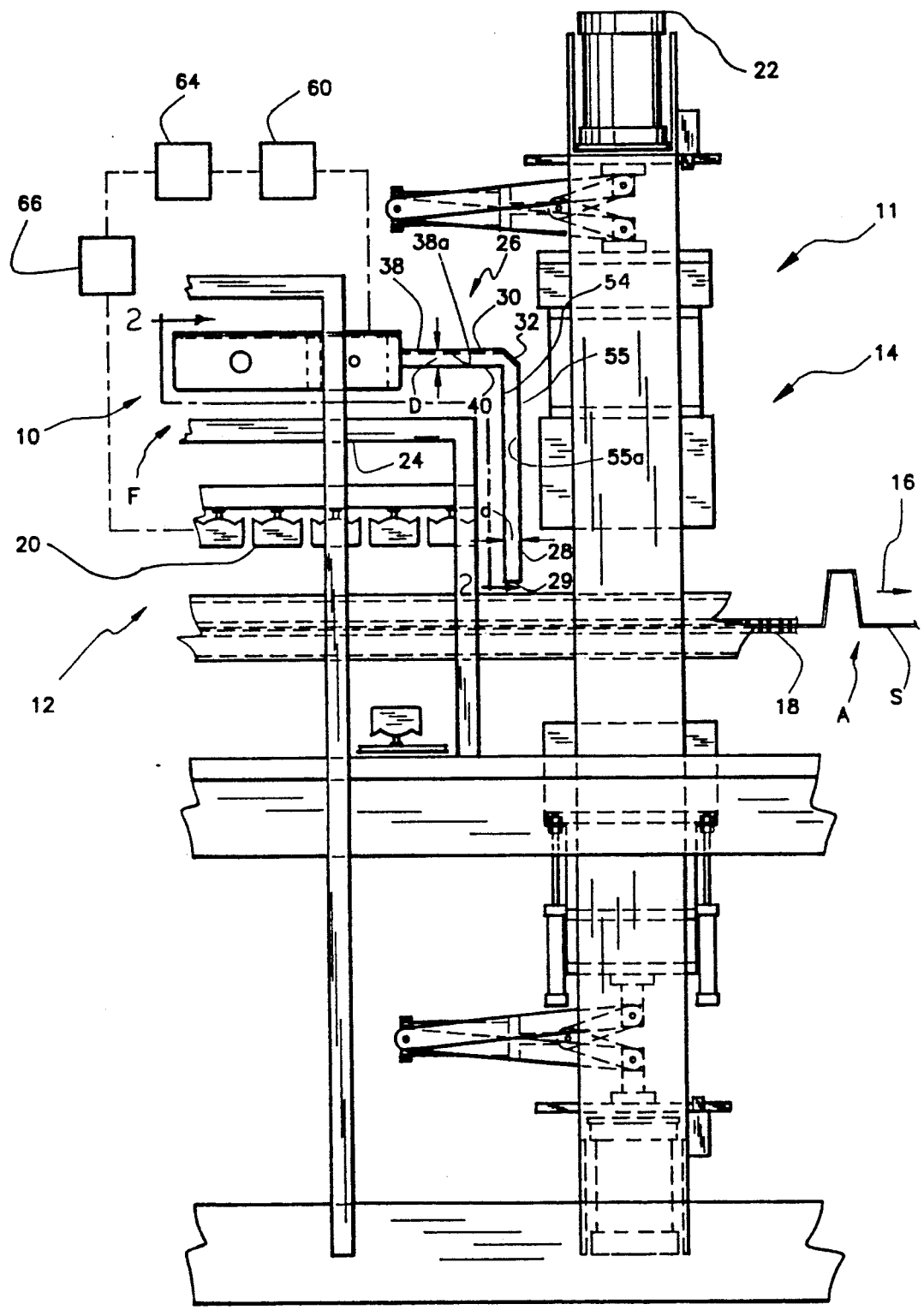
FIG. 1 is a side elevational view of a differential pressure forming machine including apparatus constructed according to the present invention.
Figure 2:
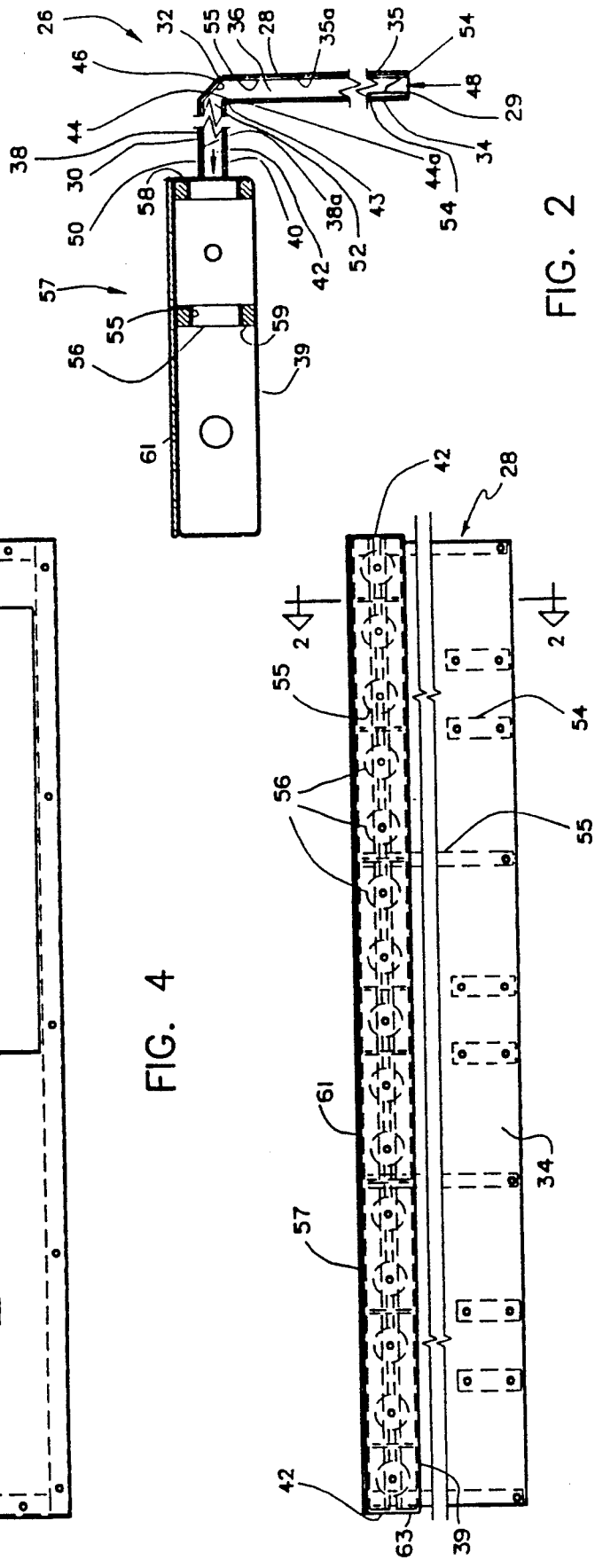
FIG. 2 is a slightly enlarged, sectional side view taken along the line 2—2 of FIG. 3 illustrating the apparatus for sensing the temperature of a thermoplastic sheet in a differential pressure forming machine according to the present invention.
Figure 4:
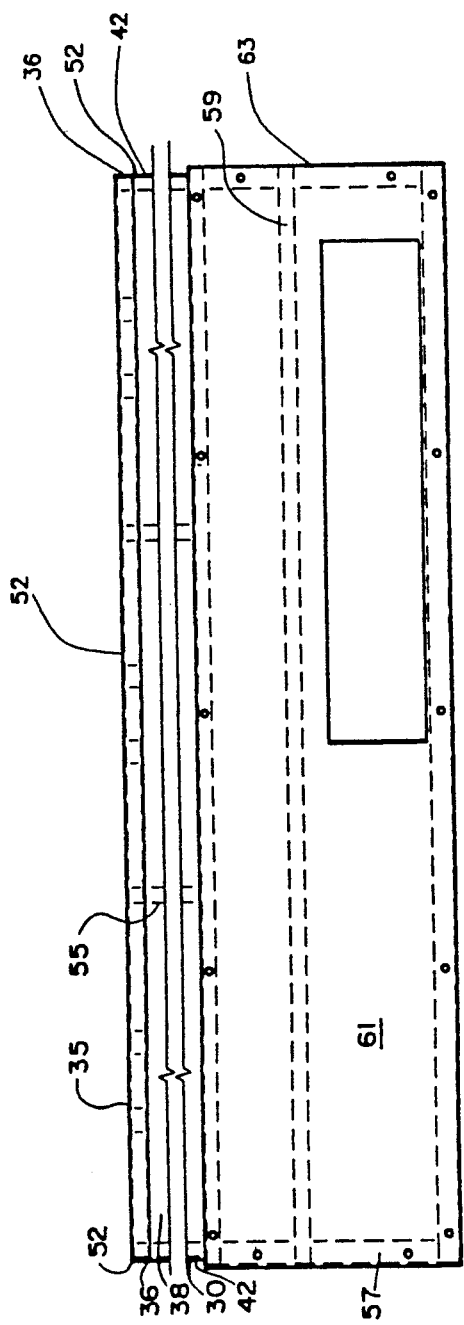
FIG. 4 is a top plan view of the apparatus illustrated in FIG. 2.
Figure 3:
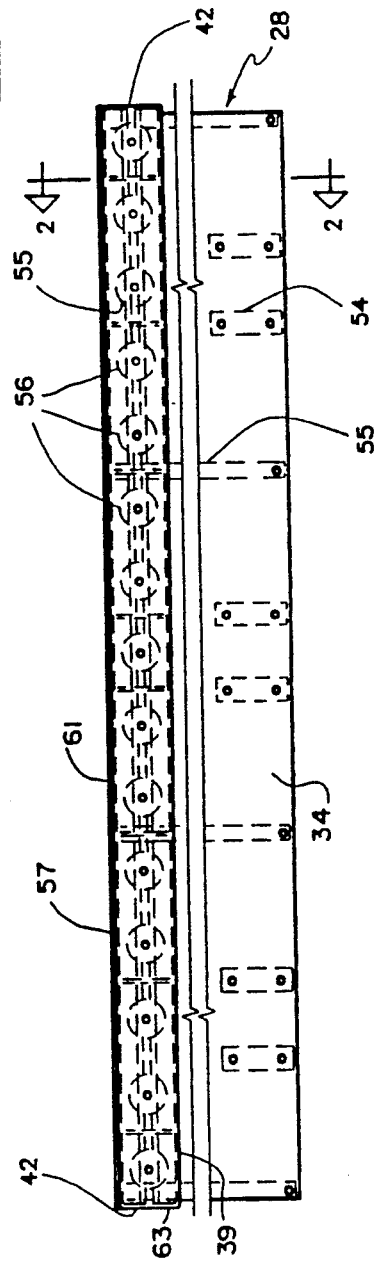
FIG. 3 is an end elevational view of the temperature sensing apparatus illustrated in FIG. 2.

Temperature sensing apparatus, constructed according to the present invention and generally designated 10, is particularly adapted for use in a differential pressure forming machine, generally designated 11, including a sheet heating oven, generally designated 12, and a differential pressure forming mold apparatus, generally designated 14, for forming an article, generally designated A, in a sheet S of thermoplastic material. The thermoplastic sheet S is conveyed in a downstream path, represented by the arrow 16 by a suitable chain conveyor, generally designated 18.

The sheet heating oven 12 includes a plurality of laterally spaced apart quartz heaters, generally designated 20, for heating the sheet to a proper plasticized state in which articles A can be molded therein. The thermoforming mold apparatus 14 is more particularly disclosed in the aforementioned U.S. Pat. No. Re. 27,137, which is incorporated herein by reference. The quartz heater 20 may be of the type sold by Brown Machine Company, Beaverton, Mich., as part No. 566X02040.

It should be noted that the differential pressure mold apparatus 14 extends to an upper level 22 which is substantially elevated relative to the upper level 24 of the oven 12.

The temperature sensing apparatus 10 constructed according to the present invention includes a hollow, wave guide channel, generally designated 26, including a first upstanding, hollow wave guide channel section 28 coupled to a horizontal, hollow wave guide tube section 30 via a hollow 90° wave guide elbow, generally designated 32.

The upstanding wave guide channel section 28 includes a pair of elongate end walls 34, 35 spanned by side walls 36. The upstanding channel wave guide channel section 28 includes a downwardly opening lower end 29 which receives and upwardly passes infrared energy emitted by the heated sheet S, represented by the arrow 48. The horizontal wave guide channel section 30 includes upper and lower walls 38 and 40 spaced apart by side walls 42 which are integral with, and in the plane of side walls 36. The lower wall 40 is integral with, but disposed normal to, the upstanding wall 34 and is joined thereto at junction 43 to provide a 90° bend in the channel 26. The lower end 29 of the channel section 28 may be disposed 8-10 inches from the sheet S.

The elbow 32 includes a reflector wall 44 integrally formed with, but extending at a 45° angle relative to, the walls 35 and 38 and includes a highly polished reflective or mirrored interior surface 46 for deflecting the infrared energy, represented by the arrow 48, emitted by the heated sheet S in a 90° path represented by the arrow 50. The elbow 32 includes side walls 52 integral with, and in the plane of, the side walls 36 and 42 of the upper and lower sections.

It should be noted that the distance d between the upstanding wave guide walls 34 and 35 is slightly greater than the distance D between the upper and lower wave guide walls 38 and 40 of the horizontally disposed wave guide channel section 30.

It is thus evident that the wave guide channel 26 upwardly guides the infrared energy, represented by the arrow 48, and thence in an upstream horizontal path of travel, represented by the arrow 50, relative to the downstream flow of sheet material, represented by the arrow 16.

The wave guide channel 26 may suitably comprise relatively thin, light weight metal such as stainless steel. To ensure that the cross-sectional area of the wave guide channel remains constant, a plurality of laterally spaced apart, upstanding reinforcing bars 54 and 55 are provided. The bars 54 are mounted along the inside surface of walls 34. The bars 55 extend along the inner surfaces 35a, 44a and 38a of walls 35, 44 and 38, respectively.

A plurality of laterally spaced apart, commercially available infrared energy sensors, generally designated 56, are mounted at the end 58 of the horizontal wave guide section 30. The sensors 56 are mounted in aligned apertures 55 provided in a pair of longitudinally spaced apart, laterally extending steel bars 59. The bars 59 are mounted within a hollow housing 57. The infrared energy emitted by the heated sheet include those electromagnetic energy rays which lie just beyond the red end of the visible spectrum. The wave lengths are longer than those of visible light and shorter than those of radio waves. The housing 57 includes a lower wall 39 mounted atop the oven frame F, a top wall 61 joined by side walls 63.

The infrared sensor 56 includes a converter 60 to convert the infrared energy to an electrical signal.

A signal conditioning electronic system, generally designated 64, is coupled to the converter 60 to suitably amplify the signal and transmit it to a data aquisition system computer, generally designated 66, which controls the power level to the oven 12 and thereby controls the temperature.

It should be understood that an identical, although inverted wave guide tube section 28 and sensors 56 could be mounted on the underside of the sheet S to control a duplicate set of heaters (not shown).

THE OPERATION

A thermoplastic sheet S is conveyed in a downstream path of travel, represented by the arrow 16, via conveyor chains 18, through the oven 12 and thence to the differential pressure forming apparatus 14.

The oven 12 is operated to heat the sheet S. As the heated sheet S passes the underside of open lower end 29 of the upstanding wave guide channel section 28, the heated sheet will upwardly emit infrared energy represented by the arrow 48. This infrared energy will be upwardly guided by wave guide section 28 and horizontally deflected by the elbow deflector surface 46 horizontally upstream, in the direction of the arrow 50 where it is received by the infrared sensors 56.

The infrared energy is then converted to electrical energy utilized to control the operation of the heating system so that the sheet may be maintained at an exact desired temperature.

The apparatus 10 constructed according to the present invention senses the temperature of the sheet S immediately prior to entering the sheet forming station 14 where the article A is formed in the sheet. The apparatus 10 likewisely minimizes the distance between the sheet heating station and the sheet forming station so that minimal cooling will occur before the article A is formed in the sheet.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claimed is:

1. Apparatus for sensing the temperature of a sheet of thermoplastic sheet which is fed downstream through an oven at a sheet heating station and then to a differential pressure forming apparatus at a sheet forming station for differentially pressure forming an article in the sheet, said apparatus comprising:

infrared energy sensing means for sensing electromagnetic energy in the infrared region of the spectrum;

hollow wave guide means, downstream of said infrared energy sensing means, for guiding infrared energy emitted by the sheet to said sensing means including a first hollow channel for guiding infrared energy emitted by the sheet to said sensing means including a first hollow channel for guiding said infrared energy in a first path;

means for mounting said first hollow channel at a location between said sheet heating station and said forming station; and a second hollow wave guide channel coupled to, but extending transversely of, said first hollow wave guide channel for guiding said energy upstream in a path, transverse to said first path, to said infrared energy sensing means.

2. Differential pressure thermoforming apparatus comprising:

a frame;

means on said frame for conveying a sheet of thermoplastic material in a downstream path of travel through a sheet heating station and a forming station;

heater means on said frame for heating a portion of said sheet at said heating station;

differential pressure forming means on said frame at said forming station for applying differential pressure to said sheet to form an article therein;

means for controlling the operation of said heater means including means for sensing the temperature of said sheet including hollow wave guide means disposed interjacent said heater means and said differential pressure forming means for guiding infrared energy emitted by the heated sheet in an upstream path of travel between said heater means and said forming means;

infrared energy sensing and control means for receiving infrared energy from said wave guide means and coupled to said heater means to control the operation thereof;

said wave guide means including a first hollow wave guide channel disposed downstream of said infrared energy sensing means between said heater means and said forming means, and a second hollow wave guide channel coupled to said first wave guide channel, but extending transversely relative thereto, for directing said infrared energy in said first channel in an upstream path of travel to said infrared energy sensing means.

3. The apparatus set forth in claim 2 wherein said first and second hollow wave guide channels are disposed at a 90° angle relative to each other.

4. Apparatus for sensing the temperature of a sheet of heated thermoplastic material at a location between an upstream sheet heating station and a downstream sheet forming station of a differential pressure forming machine comprising:

a hollow wave guide channel for guiding infrared radiation emitted by said sheet including a first hollow channel section having first and second ends and a second transversely extending hollow channel section coupled at one end to said first end of said first hollow channel section and including an opposite end;

a hollow elbow coupling said first and second hollow channel sections; and reflector means disposed inside said elbow for deflecting infrared energy from said first section to said second section; and means mounting said channel such that said second end of said first channel section is mounted adjacent said sheet; and infrared energy sensing means disposed at said opposite end of said second hollow channel section upstream of said first hollow channel section for sensing the infrared energy transmitted through said first and second hollow wave guide channels.

5. The apparatus set forth in claim 4 wherein said second section is disposed at a 90° angle relative to said first section.

6. The apparatus set forth in claim 4 wherein said first hollow channel section includes a thin wall, and a plurality of spaced apart reinforcing members are mounted to said thin wall.

7. Differential pressure forming apparatus for forming an article in a sheet of thermoplastic material comprising:

a frame, means on said frame for conveying a sheet of thermoplastic material in a downstream path of travel through a sheet heating station and a forming station;

heater means mounted on said frame for heating said sheet as it passes said heating station;

differential pressure forming means, downstream of said heating means, for forming an article in said heated sheet at said forming station;

infrared energy sensing means disposed above said heater means; and a hollow wave guide channel, downstream of said infrared energy sensing means, having an upstanding channel portion disposed between said heater means and said forming means, for upwardly guiding infrared energy emitted by said heated sheet and a traverse channel portion for receiving and transversely guiding said infrared energy upstream from said upstanding channel portion to said infrared energy sensing means.

8. The apparatus set forth in claim 7 including hollow elbow means coupling said upstanding channel portion and said transverse channel portion.

9. The apparatus set forth in claim 8 wherein deflector means is mounted interiorly of said elbow for enhancing the transfer of energy from said upstanding channel portion to said transverse channel portion.

10. The apparatus set forth in claim 9 including a plurality of spaced apart reinforcing members coupled to said upstanding channel portion stabilizing said upstanding channel portion.

11. The apparatus set forth in claim 10 wherein said infrared energy sensing means comprises a plurality of spaced apart infrared energy detectors.

* * * * *